United States Patent

Rutherford

[15] 3,706,189
[45] Dec. 19, 1972

[54] SAFETY MOWER AND LEAF HARVESTER-MULCHER

[72] Inventor: Harry T. Rutherford, 1123 Wood Heights Avenue, Baltimore, Md. 21211

[22] Filed: Feb. 4, 1972

[21] Appl. No.: 223,680

Related U.S. Application Data

[63] Continuation-in-part of Ser. No. 173,469, Aug. 20, 1971, Pat. No. 3,680,295.

[52] U.S. Cl..................................56/13.4, 56/320.2
[51] Int. Cl. ................................................A01d 87/10
[58] Field of Search..........56/320.2, 13.4, 12.8, 13.3, 56/17.5, DIG. 18

[56] References Cited

UNITED STATES PATENTS

| | | | |
|---|---|---|---|
| 2,957,295 | 10/1960 | Brown | 56/13.4 |
| 3,220,170 | 11/1965 | Smith et al. | 56/255 |
| 2,910,818 | 11/1959 | Beal et al. | 56/320.2 |
| 2,942,396 | 6/1960 | Farnam | 56/13.4 |
| 2,807,126 | 9/1957 | Bennett | 56/13.4 |
| 3,420,041 | 1/1969 | Irgens | 56/320.2 |
| 3,646,739 | 3/1972 | Dahl | 56/320.1 |
| 3,199,277 | 8/1965 | Moody | 56/16.6 |
| 3,509,703 | 5/1970 | Kunz | 56/17.4 |
| 3,413,783 | 12/1968 | Gordon | 56/320.2 |
| 942,490 | 12/1909 | Dunn | 56/DIG. 18 |

*Primary Examiner*—Russell R. Kinsey
*Attorney*—McClellan, Sr. John F.

[57] ABSTRACT

A combined rotary mower and leaf harvester and mulcher having a special 180° baffle fixed circumferentially around the blade axis to direct airflow for mulching and a deflector plate for upward discharge through a gooseneck chute which exhausts downwardly into a deck-mounted porous collector; co-acting safety features include an unbroken 360° guard skirt in the plane of the blade and a lower plate concealing the tips of the blade except at flange-protected lateral slots which allow full-width cut; height control is adjustable and the front can be raised independently of the rear for leaf cutting by the height control mechanism; a safety adapter for non-collecting mowing is also provided.

6 Claims, 7 Drawing Figures

PATENTED DEC 19 1972

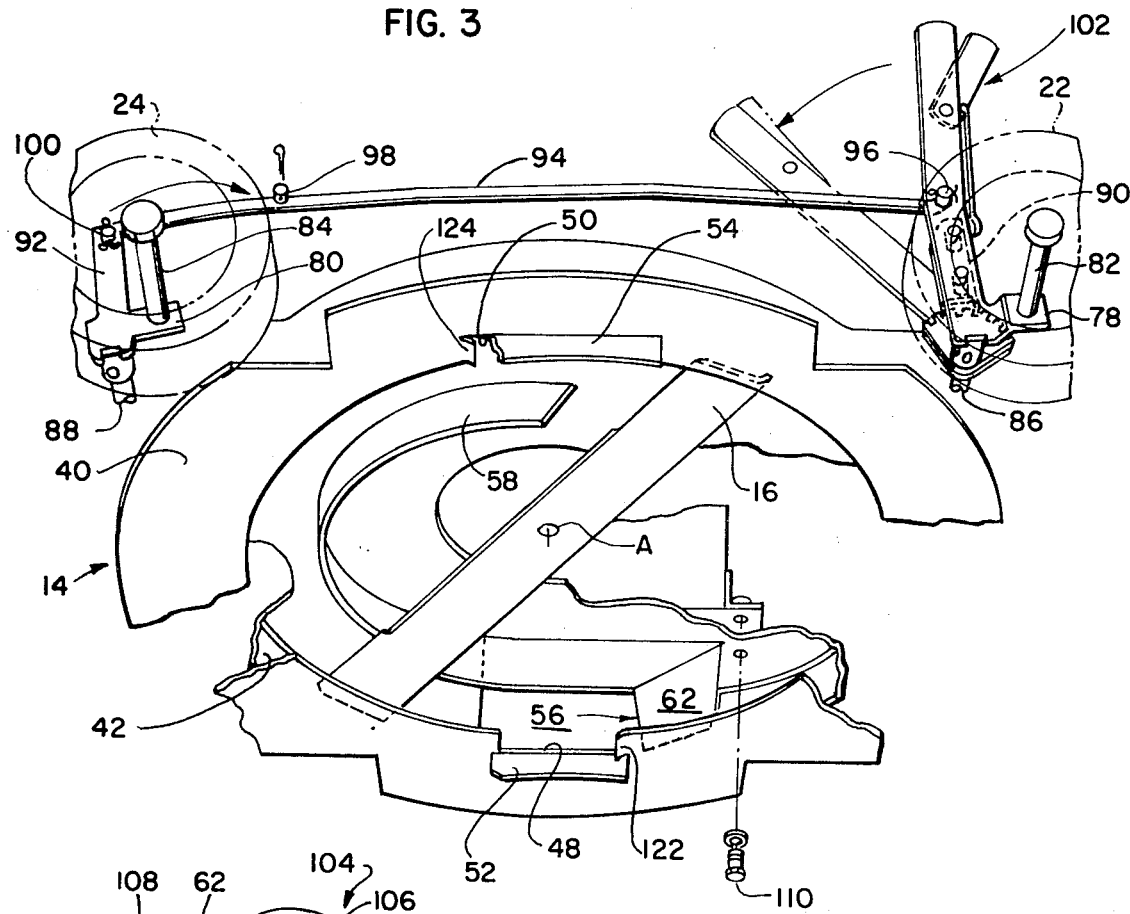

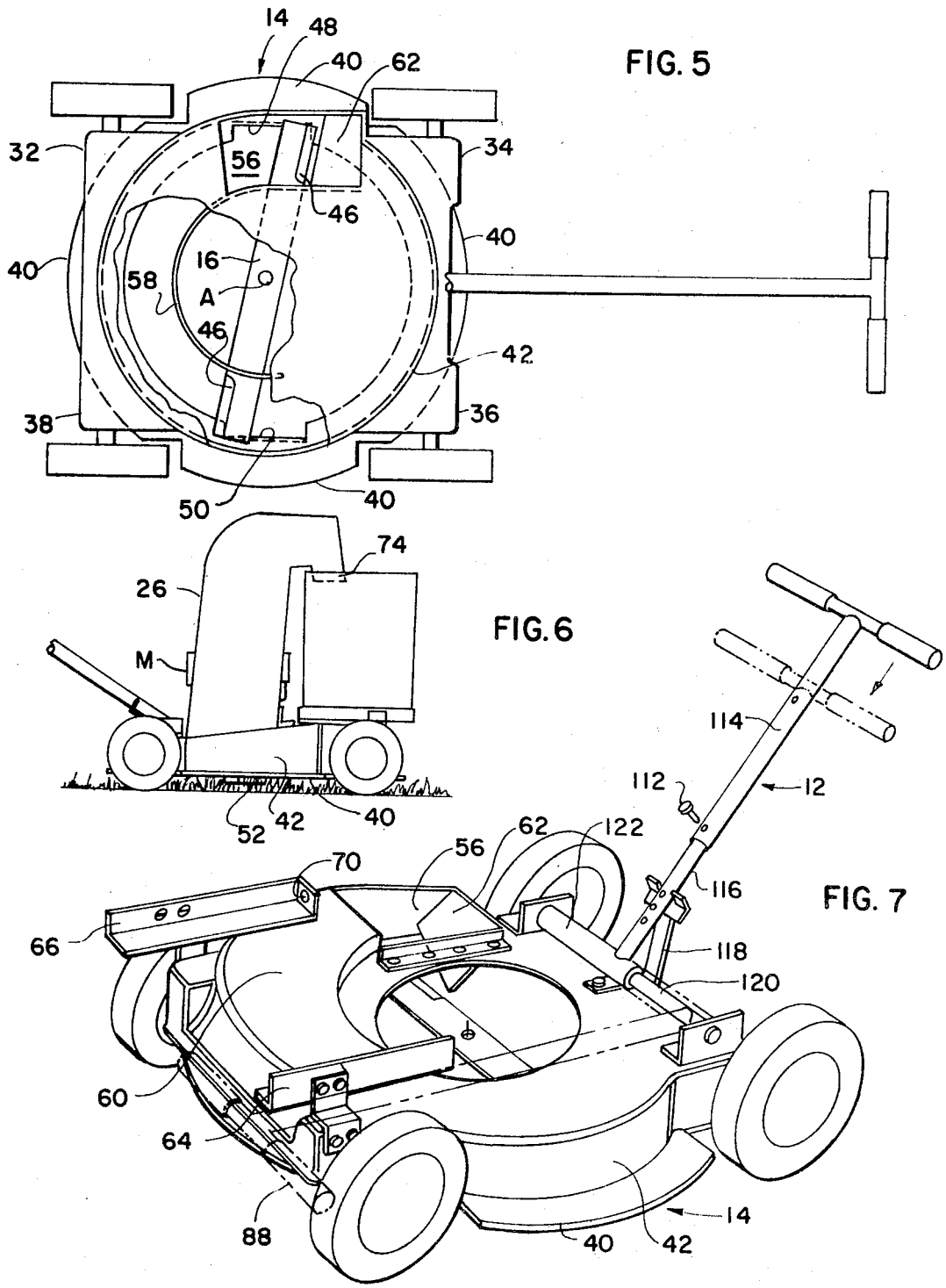

3,706,189

SAFETY MOWER AND LEAF HARVESTER-MULCHER

This application is a continuation-in-part of my co-pending application Ser. No. 173,469, now U.S. Pat. No. 3,680,295, filed Aug. 20, 1971 for SAFETY ROTARY MOWER.

This invention relates generally to mowers and particularly to a rotary mower having special blade guards and duct and baffle structure for safety and for leaf mulching.

In the prior art various mowers having rotary blades are described as leaf mulchers. However, these devices have not found popular acceptance for the dual purpose. Despite the extra expense, the vast majority of leaf mulchers used are special purpose machines not adapted for mowing and the vast majority of mowers cannot be used satisfactorily as leaf mulchers.

Difficulties encountered in trying to mulch leaves with rotary mowers include unwanted blowing and scattering of leaves, and picking up and hurling solid objects such as stones, glass, and other debris concealed by leaves. Combination mower mulchers tend to clog when used as mowers because of differences in moisture content and texture of the two substances.

Primary objects of the present invention are to overcome these difficulties by providing an economical, efficient, and extremely safe combination mower-mulcher which mows better than most mowers and mulches better than most mulchers, and which eliminates the hazards inherent in ordinary devices of both kinds.

In preferred embodiment the invention includes a half-circle baffle under the deck and a safety flange below it which together channel flow and exhaust it upward through a gooseneck which discharges downward into a deck mounted container; for mulching a special deck tilt adjustment is provided and for non-collecting mowing a direct discharge safety duct takes the place of the gooseneck; a special safety attachment deters the user from exposing the blade while running.

The above and other advantages and objects will become more readily apparent on examination of the following description, including the drawings in which:

FIG. 3 is a fragmentary detail in perspective looking upward under the left side of the invention;

FIG. 4 is a perspective detail of an interchangeable safety duct or chute;

FIG. 5 is a top plan view of details of the invention;

FIG. 6 is a side elevation; and

FIG. 7 is a perspective diagram looking diagonally rearward of portions of the top side of an embodiment of the invention.

Figure 1:
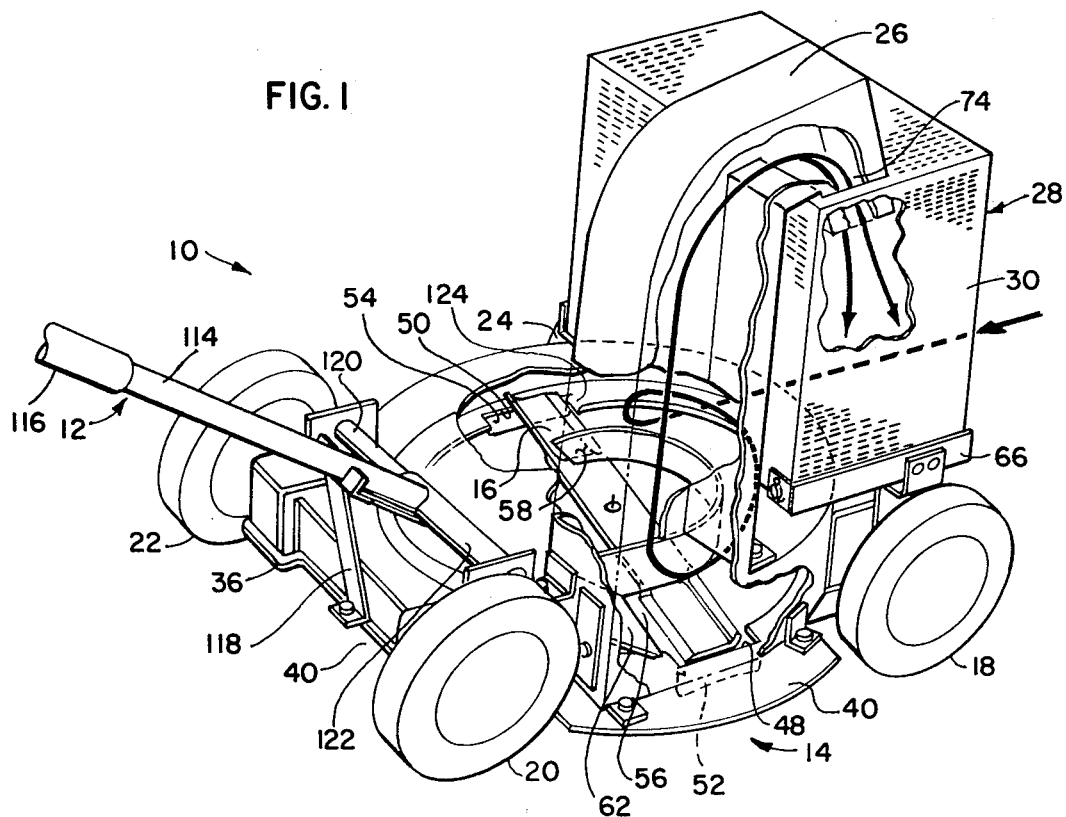
FIG. 1 is a perspective diagram, looking diagonally forward, of portions of the top side of a mower-mulcher made according to this invention.

In the drawings, like parts are designated by like numerals. For clarity of exposition the drawings do not show the motor of the invention, except as indicated at M in FIG. 6. The motor may be a conventional gasoline engine or an electric motor, and is mounted in the conventional way, with the driveshaft mounting the blade in the center of the deck in usual manner for single blade rotary mowers.

Figure 2:
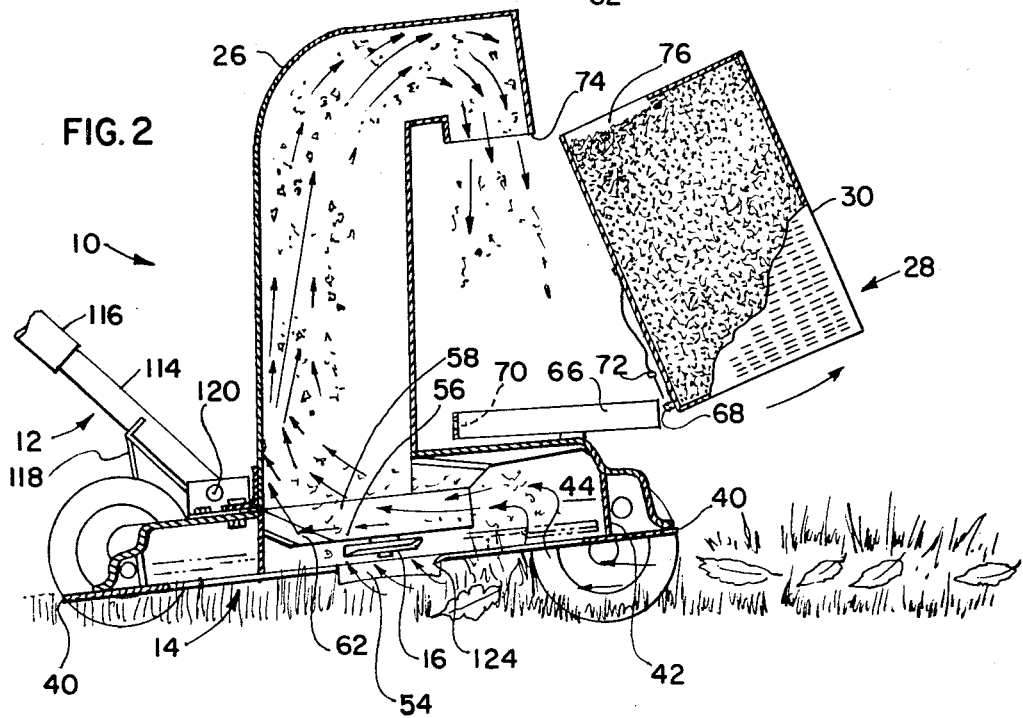
FIG. 2 is a side elevation in section of the invention.

As a brief introduction to the content of the Figures, FIGS. 1, 2 and 6 show generally most details of the invention in use as a mower and harvester-mulcher, complete with gooseneck chute and forward-position hopper. FIG. 4 is the only Figure showing the chute and hopper removed and a direct ejection safety duct substituted for the chute and hopper. The remaining Figures indicate features which are preferably a part of all embodiments of the invention, as, for example, the height-and-pitch adjustment of the wheels detailed in FIG. 3 and the handle folding provision detailed in FIG. 7.

Taking up the Figures in detail, FIG. 1 is a phantom diagrammatical view looking diagonally forward from slightly above the right rear wheel of the mower-mulcher 10 of this invention. The mower-mulcher includes a handle assembly 12 by which the operator advances and guides it, a deck assembly 14 to which the handle assembly is attached, a double ended propeller-shaped blade 16 which revolves below the top of the deck, wheels 18, 20, 22 and 24 adjustably supporting the deck, a chute 26 for exhausting material gathered and processed by the mower-mulcher, and a hopper assembly 28 for receiving the processed material, which is discharged into it in a downward direction.

The arrows indicate the path of material drawn into the mower-mulcher beneath the front edge of the skirt as the device advances. Much of the material processed is exhausted into the hopper 30 on the first pass, after circulating around no more than a third of the circumference of the deck, as indicated. Heavier material may require finer chopping to be lifted, and may circulate one or more times around the circumference of the deck before lifting and exhausting through exhaust aperture 56 and chute 26 into hopper 30.

FIGS. 2 through 7, taken in conjunction with FIG. 1, detail the structure making possible the unique, safe, cutting and mulching actions of the invention.

THE DECK ASSEMBLY

As shown best in FIG. 5, a plan detail, the deck assembly 14, is generally circular in plan, centered about axis A of blade 16 with four protruding "corners" 32, 34, 36 and 38 at the wheels. A ring-shaped or circular plate 40 on the bottom of the housing protrudes on all four sides and is sufficiently wide (about 4 inches) in the radial direction to guard against injury to a hand or foot accidentally thrust beneath the flange. The downturned periphery 42 or skirt of the deck and the circular plate 40 affixed to it form an annular channel 44 within which the tips of the blade revolve. Enclosing the tip of the blade between the deck and the bottom plate creates an extremely efficient pumping action which draws material upward into the peripheral channel and expels it upward with great velocity through exhaust aperture 56 in the top of the deck, as best indicated in FIGS. 1 and 2.

As FIGS. 2, 3 and 5 indicate best, grass cutting is done entirely by the sharpened shank 46 of the fan-shaped blade 16, except at the two side notches 48 and 50 in circular plate 40. The two notches expose the tips of the blade, allowing the blade to make a full width cut. Safety flanges 52 and 54 protrude downward at each notch to prevent contact of the blade with a hand or foot accidentally inserted into the vicinity. These downturned fore-and-aft flanges also prevent the blade tip from contacting crowned surfaces, and from slinging debris to the side. Additionally they sharply define the sides of the swath cut by preventing grass from being drawn in at the sides, making clean mowing easier in thin grass or dim light.

THE BAFFLE

Semicircular baffle 58, best shown in FIGS. 1, 3 and 5, is an optional feature which contributes to the pumping efficiency by restraining radial airflow in the forward half of the housing. The semicircular baffle protrudes downward from the underside of the deck in an arc centered on the blade axis A and having a radius the same as the swing of the inner end of the blade cutting edge. The arc of the semicircular baffle starts on the opposite side from the exhaust aperture 56 and ends at the exhaust aperture, somewhat more than 180° away from the start. The deck preferably has an approximately corresponding spiral rise 60 in the upper portion, terminating at the exhaust aperture 56, as indicated in FIG. 7. However, as noted later, the FIG. 7 embodiment does not include the semicircular baffle.

Both ends of the semicircular baffle are tapered. As indicated in FIGS. 1-3 (and in FIG. 4 which, as noted, shows a modified exhaust, to be described below) the baffle terminates in a junction with upward deflector plate 62 at the exhaust aperture 56.

THE UPWARD DEFLECTOR PLATE

Upward deflector plate 62 diagonally closes off the upper portion of the annular channel defined by the deck skirt 42, the circular bottom plate 40 and the semicircular baffle 58, so that material impelled around the channel is shunted upward, along with material lifted directly from the ground at the exhaust aperture. As noted above, the pumping action is so great that most material gets chopped and lifted without circulating around more than a portion of the forward arc of the housing.

THE EXHAUST CHUTE AND HOPPER

Since the upward deflector plate 62 lies within the deck assembly, heavy, sharp objects which are thrown against it cannot escape in any direction, but are safely hurled upward around the gooseneck of exhaust chute 26 and are ejected downward into hopper 30, shown in FIGS. 1, 2 and 6.

Even with the hopper removed, as in FIG. 2, ejection is safely downward and on the forward side, away from the operator, so that the momentum of material accelerated to unusually high velocity by the efficiency of the system is harmlessly spent. As indicated by FIGS. 1, 2 and 6, the hopper 30 is preferably perforated throughout if made of plastic, or it may be a screen basket; either construction allows maximum airflow with minimum back-pressure. It is secured in place on deck-frame 64, 66 (FIGS. 1, 2, 6 and 7) by a spud 68 which engages a hole 70 in the frame, and preferably has a cotter pin 72 to secure the spud safely in the hole. The downturned portion 74 of the chute closely fits within the top opening 76 in the hopper, further securing the hopper in place and preventing escape of fine material.

FIXED STRUCTURE CONTRIBUTING TO MULCHING

Both grass and leaves are chopped into very fine particles by the invention. Other features contribute to the mulching action. As best shown in FIG. 3, the trailing edge 122 of the right hand notch 48 and the forward edge 124 of the left hand notch 50 in the circular bottom plate 40 are turned down and sharpened. This gives a semi-scissors action on coarse material in cooperation with the blade, and also protects the blade by reducing the chances that the ends of the notches will accidentally be bent up into the path of the blade. As best shown in FIG. 1, the bottom of upward deflector plate 62 also is bevelled, giving a further semi-scissors action on coarse material. FIG. 5 indicates another provision of the upward deflector plate 62. It is installed at such an angle that the cutting edge of the blade passes it in substantially parallel relation, giving a simultaneous chop and upward thrust to material across the width of the diagonal plate. Finally, as indicated in FIG. 2, the turbulent tumbling of leaves travelling upward through the exhaust chute and ejecting downward tends to fracture brittle leaves into still smaller particles.

THE HEIGHT AND PITCH ADJUSTMENT

For grass cutting, the bottom of the mower-mulcher is preferably adjusted parallel with the ground, as in FIG. 6. For mulching, the device is preferably pitched to the rear as shown in FIG. 2. The rearward pitch accomplishes two results. First, raising the front end allows more leaves to enter and be mulched at the same time. The mower-mulcher can be pushed directly into a pile of leaves and will pull them in and mulch them without scattering any to the side or rear. Second, as best seen in FIG. 2, raising the front of the mower-mulcher lowers the rear protrusion of circular flange 40 further protecting the operator's fleet from concealed objects which may be struck, and preventing scattering. The flanges 52, 54, similarly retard scattering to the sides.

FIG. 3 shows the height-and-pitch adjustment provisions of the invention. All the wheels are preferably mounted on trailing links (78, 80 shown) having stub axles (82, 84 shown). The trailing links are pivoted to the deck structure by full axles 86 and 88. An upstanding portion (90, 92 shown) of each link on the left side of the mower-mulcher is connected by a tie-bar 94. The tie-bar has a single pivot connection 96 to the rear link, but alternative pin secured connections 98 and 100 are adapted to select and fix the angle of the link with respect to the deck assembly 14, thus providing for raising and lowering the four wheels of the device simultaneously by means of the linkage between the axles. Connected at the front pivot 100 as shown in FIG. 3, the tie bar 94 maintains the deck assembly parallel with the ground at all adjustments. FIG. 6 illustrates this level attitude. Connected at the rear pivot 98, the tie bar provides a constant offset which maintains the front of the deck assembly at a higher position than the rear at all adjustments. FIG. 2 illustrates this attitude, which is used for large-volume leaf mulching and for mowing very high weeds or other vegetation.

THE DIRECT EJECTION SAFETY DUCT

During normal mowing it may be desired to redistribute the clipping instead of catching them.

FIG. 4 illustrates the arrangement for distributing clippings in conformance with the Federal safety standard limiting projection of objects to a 5 foot range as measured from the mower. Duct 104 bolts to the deck assembly 14 in place of chute 26. Clippings rise through the exhaust aperture 56 and eject downward through the duct. As indicated by the arrows, heavy objects impinge on upward deflector plate 62, then on the circular roof 106 of the duct, and finally impinge on the straight downwardly inclined deflector 108 of the duct, before dropping harmlessly to the ground. It will be seen that all discharge from this unique mower-mulcher is up-and-over the skirt 42 of the mower-mulcher and then down. The dangers of dangerous radial discharge are completely eliminated, since the skirt 42 of the deck assembly is a continuous, unbroken ring.

The lateral extension of the duct 104 is no greater than the lateral extension of the circular bottom plate 40, which in turn approximates the lateral extension of the wheels, so that the device may be passed very close to fixed objects during operation with the direct ejection safety duct in place. FIG. 4 shows an anti-clogging provision of the duct. Clinging of wet material inside the duct is discouraged by the design of the upper portion, which is highest at the point at which the straight downwardly inclined deflector 108 commences.

FIG. 3 shows a safety feature common to both the chute 26 and the duct 104, namely the rear attachment detail at 110. Attachment bolt 110 secures both the chute and the duct from underneath the housing, making it absolutely necessary for the operator to stop the engine before attempting to change from duct to chute or vice versa.

THE FOLDING HANDLE ASSEMBLY

FIG. 7 best shows the unique folding handle assembly provided. To fold the handle assembly 12 the pin 112 is removed and then replaced with the upper handle 114 telescoped to a collapsed position over the lower handle 116. The handle assembly is then raised from fork 118 which is integral with the deck, and is slid to the left side of the mower on bar 120, which also is integral with the deck, by means of sleeve 122 which slides on the bar and is integral with the lower handle. Next the handle assembly is folded forward until it rests on the deck, as indicated by the phantom lines.

This arrangement also safely prevents the user from tipping the rear end of the mower upward during operation by raising the handle assembly, which simply yields and lifts free of the fork 118 when lifted instead of raising the mower.

FIG. 7 also shows the invention without the semicircular baffle, which, as indicated, is optional.

Obviously many modifications and variations of the present invention are possible in light of the above teachings. It is, therefore, to be understood that within the scope of the appended claims the invention may be practiced otherwise than as specifically described.

What is claimed and desired to be obtained by United States Letters Patent is:

1. In a combination lawnmower and leaf harvester-mulcher having a blade-housing comprising a deck and a skirt depending from the deck, a blade adapted to rotate within the housing about a vertical axis, a motor adapted to rotate the blade, wheels supporting the housing, and a handle attached to the housing, the improvement comprising: the skirt being continuous around the blade, the deck having an upward facing exhaust aperture at a peripheral portion thereof, an upward deflector plate fixed at an angle above the blade at the exhaust aperture, an exhaust chute fixed above the exhaust aperture, and folding handle structure including a laterally sliding attachment to the deck, means for pivoting the handle forward outboard of the motor, and means for preventing the handle from sliding laterally.

2. A device as recited in claim 1, wherein the laterally sliding attachment and the means for pivoting the handle forward comprise a tubular end of the handle engaging a laterally extended way fixed to the housing.

3. A device as recited in claim 2, wherein the means for preventing the handle from sliding laterally comprises a fork fixed to the housing and extending upward to engage the shank of the handle.

4. A device as recited in claim 3, wherein the handle has telescoping shank portions.

5. In a combination lawnmower and leaf harvester-mulcher having a blade-housing comprising a deck and a skirt depending from the deck, a blade adapted to rotate within the housing about a vertical axis, a motor adapted to rotate the blade, wheels supporting the housing, and a handle attached to the housing, the improvement comprising: the skirt being continuous around the blade, the deck having an upward facing exhaust aperture at a peripheral portion thereof, an upward deflector plate fixed at an angle above the blade at the exhaust aperture, an exhaust chute fixed above the exhaust aperture, and the wheel support of the housing having means for adjusting the height of the housing including means for tilting the forward end of the housing upward for leaf harvesting, weed cutting and the like.

6. A device as recited in claim 5, wherein housing height adjustment means and the housing tilt means comprises a front axle, a rear axle, link attachment of the wheels to the axles, a tie bar connecting a front wheel link with a rear wheel link, handle and adjustable stop means for simultaneously setting the angular positions of the links with respect to the axles and an alternate-position connections for varying the effective length of the tie bar connection and thereby tilting the housing.

* * * * *